United States Patent Office 2,814,099
Patented Nov. 26, 1957

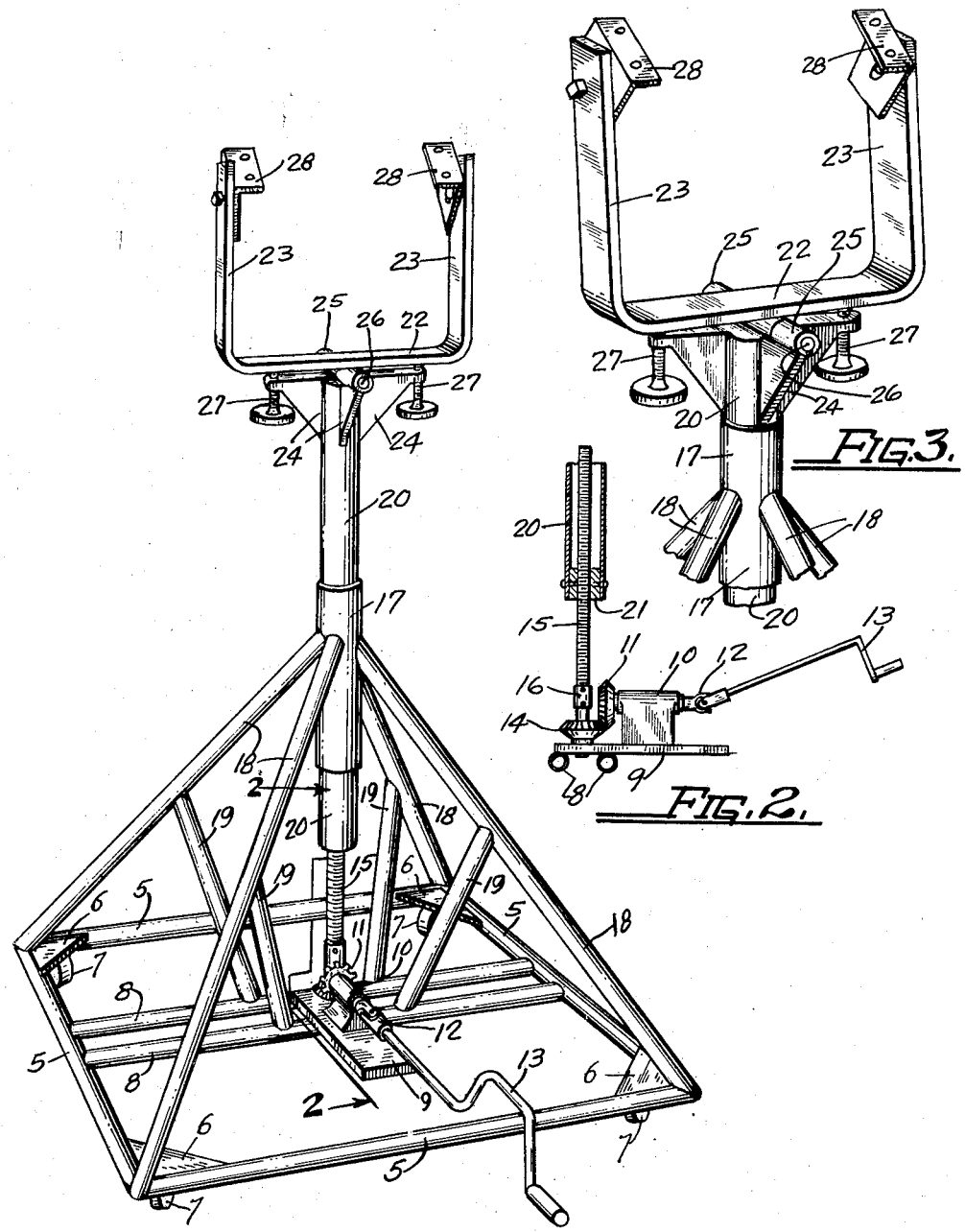

2,814,099
COMBINATION JACK AND WORK STAND

Donald M. Knittel, Denver, Colo.

Application April 29, 1953, Serial No. 351,897

5 Claims. (Cl. 29—289)

This invention relates to an improvement in combination jack and work stand and is designed more particularly for use by automobile and truck mechanics in assembling and disassembling automobile and truck transmissions.

Present day automobile and truck transmissions are complicated, heavy and awkward to handle and since they must be removed from the vehicles for repair, replacement of parts and for some adjustments they are usually placed on the mechanic's work bench. Since some work can be more readily done from one side than the other it is frequently necessary to turn the transmission 180 degrees.

All mechanics are not of the same height and the bench that is suitable for one may be very unsuitable for another.

It is the object of this invention to produce a stand comprising a wide base that rests on casters and which can therefore be readily moved from one position and to provide the stand with a cradle that can be raised and lowered and also tilted and rotated about a vertical axis.

In order to explain the invention and the manner in which it is used reference will now be had to the accompanying drawing in which the invention has been illustrated and in which Figure 1 is a perspective view showing the shape and general arrangement of the parts;

Figure 2 is a view, partly in section and partly in elevation showing one means for raising and lowering the stand, and Figure 3 is an enlarged perspective view of the cradle portion.

In the drawing reference numerals 5 have been applied to the four side members of the rectangular base and reference numerals 6 designate the gusset reenforcing plates at the corners. The base is supported on four casters 7. A transverse brace shown as comprising two spaced parallel bars 8 connects two oppositely positioned side members 5 and secured by welding, or otherwise, to the top of base bars 8 is a plate 9 to the upper surface of which is secured an elongated bearing 10 in which is journaled a shaft having a bevel gear 11 at one end and a universal 12 and crank 13 at the other end. Another bevel gear which has been designed by numeral 14 is pivoted in a bearing in plate 9 for rotation about a vertical axis as shown most clearly in Figure 2. A vertical threaded bar or screw 15 is connected with gear 14 by a coupling member 16. An elongated tubular bearing 17 is supported vertically above the gear assembly shown in Figure 2 and in axial alignment with the threaded bar or screw 15, by four tubular support bars 18 whose lower ends are welded to the corners of the base and whose upper ends are welded to the tubular bearing, all as shown in Figure 1. The base with the tubular bars forms a rectangular pyramid whose vertex is formed by bearing 17. The stand is further strengthened by bracing struts 19 connected between the brace bars 8 and the support bars. Slidable and rotatable in bearing 17 is a tubular standard 20 which has attached to its lower end a nut 21 with which screw 15 is in threaded engagement. Attached to the upper end of the standard 20 is a work supporting cradle comprising a bottom bar 22 and vertical sides 23 forming a wide upwardly opening U-shaped member. Attached to the upper end of the standard 20 are four triangular wings 24 which are spaced angularly at 90 degrees. Two diametrical wings have bearings 25 in which is journaled a pivot 26 which is welded to the under side of the bar 22. The other pair of wings are provided at their ends with threaded openings for adjusting screws 27 which engage the under side of bar 22 and by means of which the cradle can be tilted. Attached to the vertical sides 23 of the cradle are clamping members 28 which can be adjusted to engage a transmission housing positioned in the cradle. Members 28 are intended to represent means for the purpose explained and may be replaced by any other mechanical equivalent means.

The standard 20 may be raised and lowered by turning screw 15 in nut 21 and the cradle may be rotated about the axis of the screw and standard to any desired position. The cradle can be tilted to any suitable angle. If a greater degree of tilt is desired than what can be effected by the parts as illustrated suitable changes may be made.

The device above described is employed in the removal and the replacement of the transmission from the automobiles or trucks and the transmissions are not removed from the cradle until they are replaced.

The fact that the stand is mounted on casters makes it possible to move the stand and the transmission to any place on the shop floor. It will be observed that the base is large and that the lift has a long vertical range.

What is claimed as new is:

1. Supporting means for a body of work comprising a base, a standard, means supporting the standard vertically on the base for both longitudinal movement and rotational movement about its axis, means for effecting the longitudinal movement of the standard, a work cradle having an elongate bottom bar disposed across the top of and over the standard and having upright arms spaced apart in the direction of the length of the bottom bar, means forming a pivot between said cradle bottom bar and the top of the standard for turning the cradle on an axis perpendicular to and midway between the ends of the said cradle bottom bar, means carried by the standard and located upon opposite sides thereof below and in the vertical plane of the cradle bottom bar for selectively applying vertical thrust to the said bottom bar to effect turning of the cradle on said pivot axis, and elements carried by the cradle arms for attachment to a body of work to support the latter in the cradle.

2. The invention according to claim 1 wherein the said means carried by the standard comprises a pair of hand operated screws and wing members integral with the standard and projecting outwardly therefrom below the cradle bottom bar and having threaded bores through which said screws are threaded.

3. The invention according to claim 1, wherein the said pivot forming means embodies wing members integral with the standard upon opposite sides thereof and projecting outwardly therefrom, a bearing upon the top of each wing member, said bearings being aligned on the said turning axis, a bearing secured across the cradle bottom bar and aligned with and lying between the wing carried bearings, and a pivot pin passing through the aligned bearings.

4. The invention according to claim 3, wherein the said means for selectively applying vertical thrust to the cradle bottom bar comprises a pair of hand screws and wing members integral with the standard and projecting outwardly therefrom below the cradle base and having threaded bores through which said screws are threaded.

5. A combined jack and work stand comprising in combination a base frame of polygonal contour including a number of joined side bars, supporting casters secured to the underside of said frame, a transverse brace connecting two of said side bars, upwardly converging support bars having lower ends secured to the base frame at corners thereof, a vertical tubular bearing between and secured to the convergent ends of said support bars, a plate secured upon said transverse brace below said bearing, bracing struts secured to said transverse brace upon opposite sides of and in close proximity to said plate and each strut rising toward and being secured to a support bar, a standard disposed vertically in and extending through said tubular bearing for longitudinal and axial rotational movement, a vertical screw rotatably supported on said plate coaxial with the standard and threaded into the lower end portion thereof, means on said plate and operatively coupled with said screw for effecting rotation of the screw and raising and lowering of the standard thereby, an upwardly directed work body supporting cradle mounted upon the top end of said standard for oscillatory adjustment, said standard comprising an elongate bottom bar and upright arms at the ends of the bottom bar, a pivot means coupling said bottom bar with the top end of the standard for oscillation on an axis transversely of the bottom bar, a pair of laterally projecting elements on opposite sides of and carried by the standard and lying beneath said bottom bar, upwardly directed screws each threadedly connected with one of said laterally projecting elements for engagement with the overlying bottom bar, and means for mounting a work body in the cradle between said arms.

References Cited in the file of this patent

UNITED STATES PATENTS

| | | |
|---|---|---|
| 131,920 | Westgate | Oct. 1, 1872 |
| 426,267 | Greenlow | Apr. 22, 1890 |
| 961,003 | Palmenberg | June 7, 1910 |
| 975,548 | Lovejoy | Nov. 15, 1910 |
| 1,073,294 | Siewert | Sept. 16, 1913 |
| 1,214,378 | Sadlock | Jan. 30, 1917 |
| 1,499,280 | Alheit | June 24, 1924 |
| 1,685,144 | Austin | Sept. 25, 1928 |
| 1,708,761 | Horbath | Apr. 9, 1929 |
| 1,833,781 | Fuller | Nov. 24, 1931 |
| 2,106,367 | Vollmer | Jan. 25, 1935 |
| 2,140,617 | Castady | Dec. 20, 1938 |
| 2,430,826 | Rodman | Nov. 11, 1947 |
| 2,487,827 | Persson | Nov. 15, 1949 |